(12) United States Patent
Ore

(10) Patent No.: US 6,327,529 B1
(45) Date of Patent: Dec. 4, 2001

(54) RANGE CONTROL

(75) Inventor: Thomas G. Ore, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/617,187

(22) Filed: Jul. 14, 2000

(51) Int. Cl.$^7$ .................................................. F16H 59/04
(52) U.S. Cl. ............................. 701/55; 701/51; 91/473; 74/335
(58) Field of Search ................................. 701/55, 51, 54, 701/56; 91/473; 192/3.51; 74/335, 336

(56) References Cited

U.S. PATENT DOCUMENTS

| | | | |
|---|---|---|---|
| 4,361,060 | 11/1982 | Smyth | 477/124 |
| 4,754,665 | 7/1988 | Vandervoort | 74/745 |
| 5,390,561 | 2/1995 | Stine | 74/331 |
| 5,592,851 | 1/1997 | Bates et al. | 74/336 |
| 5,755,639 | 5/1998 | Genise et al. | 477/111 |
| 5,766,111 | 6/1998 | Steeby et al. | 477/124 |
| 5,791,189 | 8/1998 | Newbigging | 74/735 |
| 5,911,787 | 6/1999 | Walker | 74/335 |
| 5,974,906 | 11/1999 | Stine et al. | 74/335 |
| 6,108,600 | * 8/2000 | Lehner et al. | 701/55 |
| 6,175,797 | * 1/2001 | Iizuka | 701/51 |
| 6,223,112 | * 4/2001 | Nishino | 701/55 |

* cited by examiner

*Primary Examiner*—Richard M. Camby
(74) *Attorney, Agent, or Firm*—Howard D. Gordon

(57) ABSTRACT

A controller-assisted, manually shifted compound transmission system (10) and range shift control method therefor. Range section (16B) shifts are normally automatically implemented by a range shifter (28) under commands (56) from a controller (54) in response to manual initiation. Under certain operating conditions (($ES_{MIN}<OS*GR$) and ($ES_{MAX}<OS*GR_{CLR}$)) automatic range downshifts without driver initiation are commanded.

24 Claims, 5 Drawing Sheets

RANGE CONTROL

BACKGROUND OF THE INVENTION

1. Field of the Invention

The present invention relates to automatic range shifting in a manually shifted compound transmission having a lever-shifted main section connected in series with an auxiliary range section. In particular, the present invention relates to a range control for transmissions of the type described for automatically implementing driver-initiated range shifts which, under certain unusual operating conditions, will automatically implement range shifts not requested or initiated by the driver.

2. Description of the Prior Art

Controller-assisted, manually shifted transmission systems are known in the prior art, as may be seen by reference to U.S. Pat. Nos. 5,582,558; 5,755,639; 5,766,111 and 5,791,189, the disclosures of which are incorporated herein by reference.

Compound transmissions having a range- and/or combined range-and-splitter-type auxiliary transmission section are well known in the prior art, as may be seen by reference to U.S. Pat. Nos. 4,754,665 and 5,390,561, the disclosures of which are incorporated herein by reference.

Compound transmissions having automatically implemented range shifting are well known in the prior art, as may be seen by reference to U.S. Pat. Nos. 5,911,787 and 5,974,906, the disclosures of which are incorporated herein by reference.

A semi-automated transmission having a hold mode wherein, under certain conditions, an automatic shift will occur while in the hold mode in the absence of a shift selection, may be seen by reference to U.S. Pat. No. 5,592,851, the disclosure of which is incorporated herein by reference.

SUMMARY OF THE INVENTION

In accordance with the present invention, a manually shifted compound transmission with a range auxiliary section is provided which, in the event of a sudden vehicle deceleration with an operator failure to downshift, will automatically do an allowable range downshift to maintain vehicle drivability in the absence of operator movement of the shift lever.

The foregoing is accomplished in a manually shifted compound transmission having a lever-shifted main section connected in series with a range auxiliary section having an actuator for automatically implementing driver initiated range shifts by sensing conditions requiring an automatic, unrequested range downshift, such as, for example, a sudden vehicle deceleration to a relatively low vehicle speed while the transmission remains in a high range ratio, which will cause engine speed to become unacceptably low. In such conditions (often associated with a panic stop or the like), if a range downshift without shifting the main transmission section is allowable, such a shift will be implemented automatically and without driver request. Preferably, a warning display and/or alarm or the like will be activated to inform the driver that he should take corrective action to place the shift lever and/or range selector into a correct position.

Accordingly, it is an object of the present invention to provide a new and improved range control for manually shifted compound transmissions having a range shifter for automatically implementing driver-initiated range shifts.

This and other objects and advantages of the present invention will become apparent from a reading of the following description of the preferred embodiment taken in connection with the attached drawings.

DESCRIPTION OF THE PREFERRED EMBODIMENT

Figure 1:
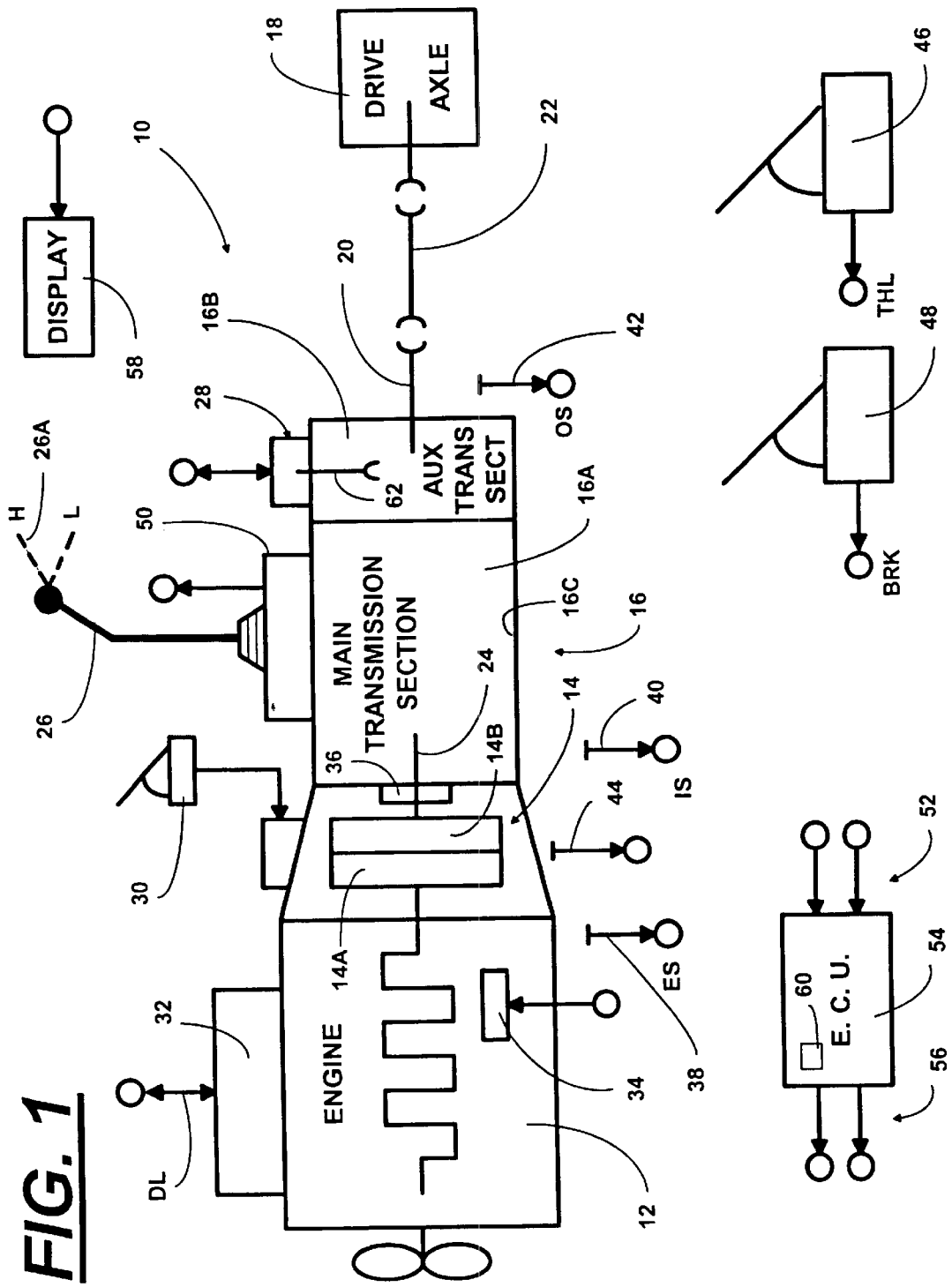
FIG. 1 is a schematic illustration of a controller-assisted, manually shifted compound transmission advantageously utilizing the range control of the present invention.
Figure 2:
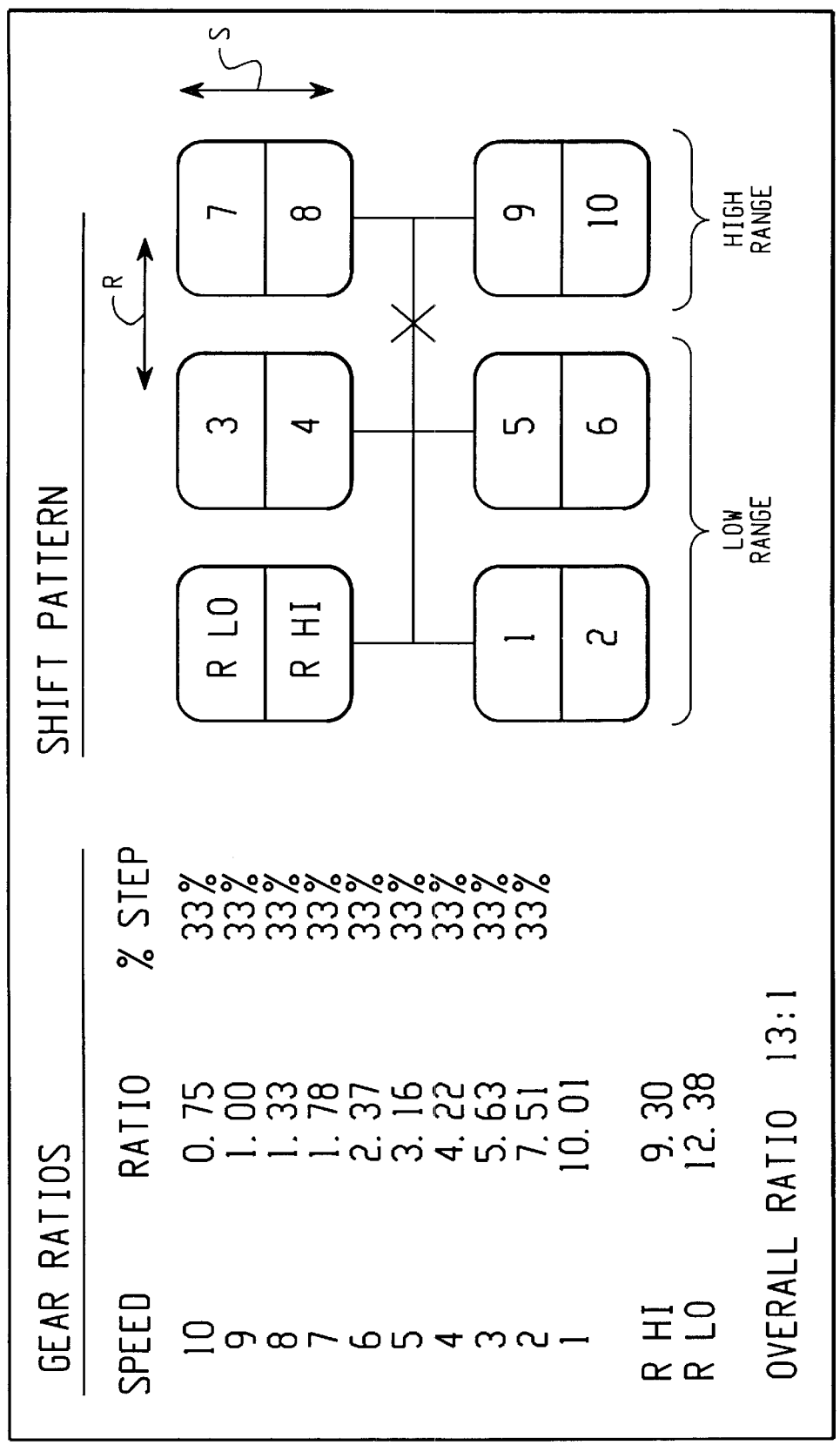
FIG. 2 is a schematic illustration of a shift pattern for a preferred embodiment of the transmission of FIG. 1.
Figure 3:
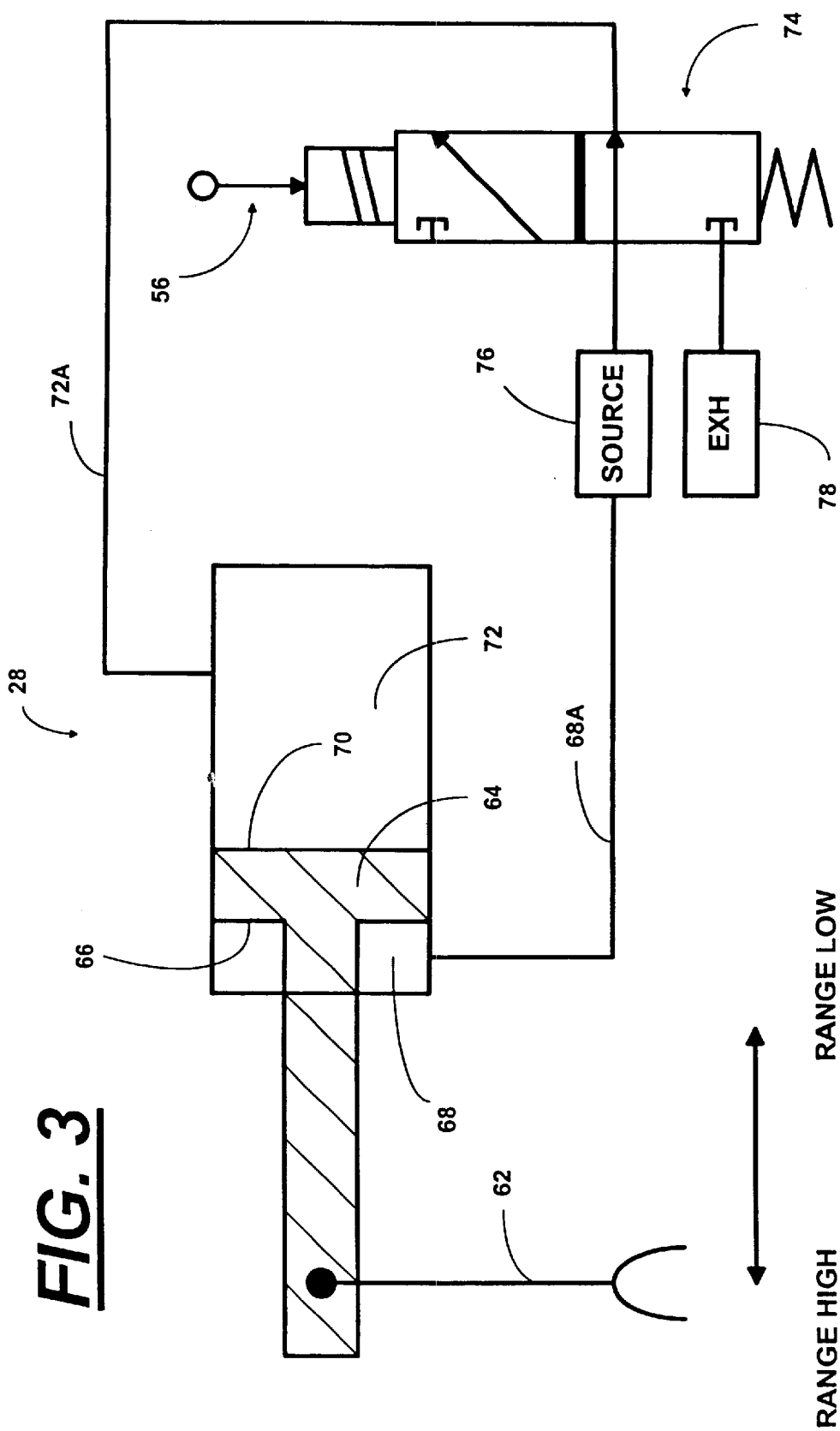
FIG. 3 is an enlarged schematic illustration of a preferred embodiment of the range shift mechanism of the present invention.

A computer-assisted (i.e., microprocessor-based, controller-assisted) vehicular compound mechanical transmission system 10, particularly well suited to utilize the range control of the present invention, may be seen by reference to FIGS. 1, 2 and 3.

System 10 is of the type commonly utilized in heavy-duty vehicles and includes an engine, typically a diesel engine 12, a master friction clutch 14 contained within a clutch housing, a multiple-speed compound transmission 16, and a vehicular drive axle assembly 18. The transmission 16 includes an output shaft 20 drivingly coupled to a vehicle drive shaft 22 by universal joints for driving the drive axle assembly.

Master friction clutch 14 includes driving friction members 14A driven by the engine and driven friction members 14B, which are carried by the transmission input shaft 24. Compound mechanical change-gear transmission 16 will typically include a main transmission section 16A and a range- or combined splitter-and-range-type auxiliary transmission section 16B, all contained within a common transmission housing 16C. Compound mechanical change-gear transmissions of this type are well known in the prior art, and examples thereof may be seen by reference to aforementioned U.S. Pat. Nos. 4,754,665 and 5,390,561.

The main transmission section 16A is manually shifted by a manually operated shift lever 26, while the range-type auxiliary transmission section 16B is shifted by a range actuator assembly 28, one example of which is schematically illustrated in FIG. 3, to be described in greater detail below.

A clutch pedal 30 is provided for manually operating master clutch 14, although clutch 14 could also be automatically operated within the scope of the present invention.

Engine 12 is preferably electronically controlled and includes an engine controller 32 communicating over an electronic data link DL. Preferably, the data link will operate under an industry standard protocol, such as SAE J-1922, SAE J-1939, ISO 11898 or the like. The system also may include an engine compression brake 34 and/or an input shaft retarding device, such as an inertia brake 36.

The system may include sensors 38 for sensing engine rotational speed (ES), 40 for sensing input shaft rotational speed (IS), 42 for sensing output shaft rotational speed (OS), 44 for sensing the engaged or disengaged condition of the clutch, 46 for sensing the operator-set throttle pedal position (THL), 48 for sensing operation of the vehicle brake system (BRK), 50 for sensing the position of the main section shifting mechanism (MS), and the like. These and other sensors will send input signal 52 to a controller 54, which will process same according to predetermined logic rules to issue command output signals 56 to various system actuators.

The controller or ECU 54 is preferably a microprocessor-based control unit of the type illustrated in U.S. Pat. Nos. 4,595,986; 4,361,065 and 5,335,566, the disclosures of which are incorporated herein by reference. Controller 54 may be incorporated into the engine control 32.

The system actuators operated by the ECU output signals 56 will include the range section actuator 28 and possibly the engine controller 32, the engine compression brake 34, the input shaft or upshift brake 36, and a display or warning unit 58. ECU 54 may include a timing unit 60.

The range shift mechanism 28 may be seen in greater detail by reference to the schematic illustration of FIG. 3. The range shift mechanism 28 includes a shift fork 62 for positioning a range clutch, typically a double-sided, synchronized jaw clutch, in either the range-high or range-low position. Shift fork 62 is carried or positioned by a differential area piston 64 having a smaller area piston face 66 constantly exposed to pressurized air in chamber 68 and a larger area piston face 70 exposed to the selectively pressurized and exhausted piston chamber 72. Conduit 68A constantly connects chamber 68 to the source 76. Chamber 72 is selectively pressurized and exhausted by means of a two-position, three-way, solenoid-controlled valve 74, which will selectively connect a conduit 72A to either the source of pressurized fluid 76 or to an exhaust to atmosphere 78. The solenoid-controlled valve 74 is operated in response to command output signals 56 from the ECU 54. While a pressure-actuated range shift mechanism 28 is illustrated, it is understood that within the scope of the present invention, the range shift mechanism 28 could also utilize hydraulic and/or electric actuators or the like.

FIG. 2 schematically illustrates the shift pattern for a preferred embodiment of compound transmission 16. In the embodiment illustrated in FIG. 2, the transmission is a 10-forward-speed transmission having a combined range-and-splitter-type auxiliary section. Transmissions of this type are well known in the prior art and are sold under the trademark 'Super-10' by the assignee of this invention, Eaton Corporation, and may be seen in greater detail by reference to U.S. Pat. No. 5,000,060, the disclosure of which is incorporated herein by reference. As is known, each of the large rectangular blocks of the shift pattern represents a shift lever position, while the vertical divisions of the blocks represent splitter shifts within each shift lever position. The main transmission section 16A has four selectively engageable main section ratios, one for reverse, one for ½, one for ¾ or ⅞, and one for ⅝ or ⁹⁄₁₀. In other words, the ¾ shift lever position engages the same main section gear as does the ⅞ shift lever position. However, in the ¾ position, the range is in the low range ratio, and in the ⅞ shift lever position, the range is in the high ratio. As the shift lever is moved from the middle leg of the shift pattern (¾ and ⅝) to the left leg (⅞ and ⁹⁄₁₀), a manual selection or initiation of an automatically implemented range shift occurs. Shift patterns of this type are commonly referred to as "double-H" type shift patterns. Alternatively, in a "repeat-H" type shift pattern, range shifts may be manually implemented by using a range position selector 26A, as shown in dotted lines in FIG. 1.

Accordingly, it may be seen that, if in high range, a downshift of four ratios may be accomplished without requiring the operator to move the shift lever by simply performing a range downshift (i.e., a 10th-to-6th downshift or a 7th-to-3rd downshift, etc.). Similarly, if in high range and in high splitter ratio (i.e., if in 8th or 10th) without moving the shift lever, a downshift of five ratios may be accomplished by causing a range and a splitter downshift (i.e., a 10th-to-5th downshift or an 8th-to-3rd downshift).

According to the present invention, there are certain circumstances under which such an automatic downshift without requiring any operator intervention or initiation may be deemed desirable.

If (i) in a high range ratio (for the shift pattern in FIG. 2, 7th, 8th, 9th or 10th), (ii) calculated engine speed (ES=OS*GR) is less than a minimum acceptable engine speed (about 600 to 900 RPM for a heavy-duty diesel engine), and (iii) calculated engine speed in a corresponding low range ratio (ES=OS*$GR_{CLR}$) is less than a maximum acceptable engine speed (about 2100 to 2500 RPM for a heavy-duty diesel engine), then an automatic range downshift from high range to low range may be commanded without any initiation by the operator.

In addition to the above-listed conditions, additional preconditions for a non-requested automatic range downshift may include one or more of the following: (i) rapid vehicle deceleration as might occur in a panic stop situation, (ii) operation of the vehicle brake systems and/or (iii) absence for a period of time of movement of the shift lever and/or a range selector 26A.

Figure 2A:
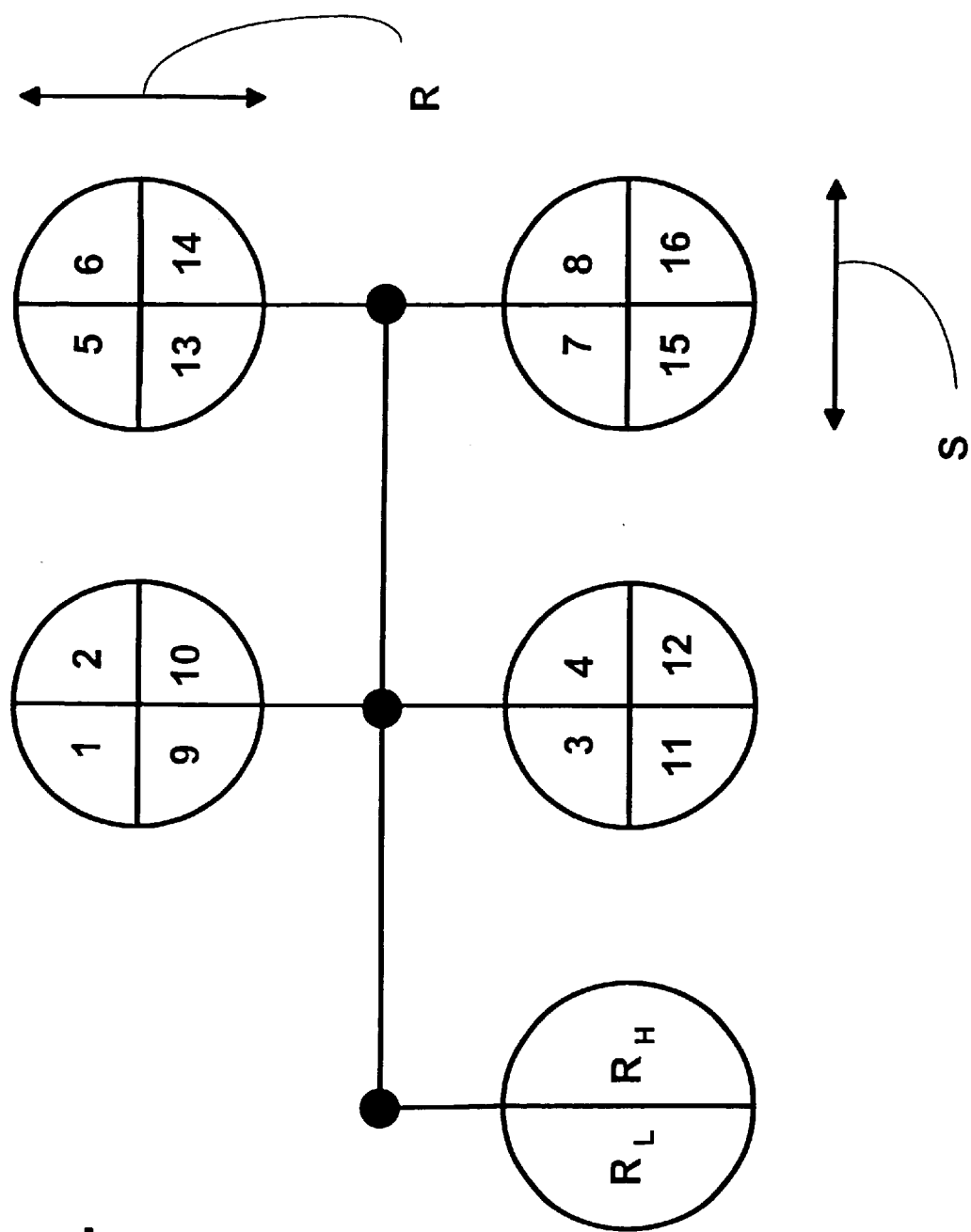
FIG. 2A is a schematic illustration of an alternate shift pattern for an embodiment of the transmission of FIG. 1.

A "corresponding low range ratio", $GR_{CLR}$, is that ratio in the low range which has the same main section engaged ratio as a particular high range ratio. For example, in the shift pattern in FIG. 2, for 10th speed, 6th and 5th are corresponding low range ratios. Sixth corresponds to the same main section and splitter ratio as 10th. Fifth corresponds to the same main section ratio and a different splitter ratio as 10th. For the "repeat-H" type shift pattern of FIG. 2A, 7th and 8th are corresponding low range ratios of 16th.

After an automatic range downshift to a corresponding low range ratio, preferably a warning or notice will be issued to the driver by means of the visual and/or audible display device 58, which will inform the driver to take corrective action, such as moving the shift lever or range selector to a position corresponding to the actually engaged ratio.

In one possible situation, in a rapid braking situation to avoid an accident (sometimes referred to as a "panic stop"), the driver should downshift rapidly to avoid stalling the engine and/or maintain vehicle drivability.

According to the present invention, if, while in a high range ratio, a rapid vehicle deceleration occurs and vehicle speed and, thus, engine speed (ES=OS*GR) drops below an acceptable level ($ES_{MIN}$) without movement of the shift lever, and if a shift to the low range corresponding ratio is allowable ($ES_{MAX}$<OS*$GR_{CLR}$), the unrequested automatic range shift will be commanded.

Figure 4:
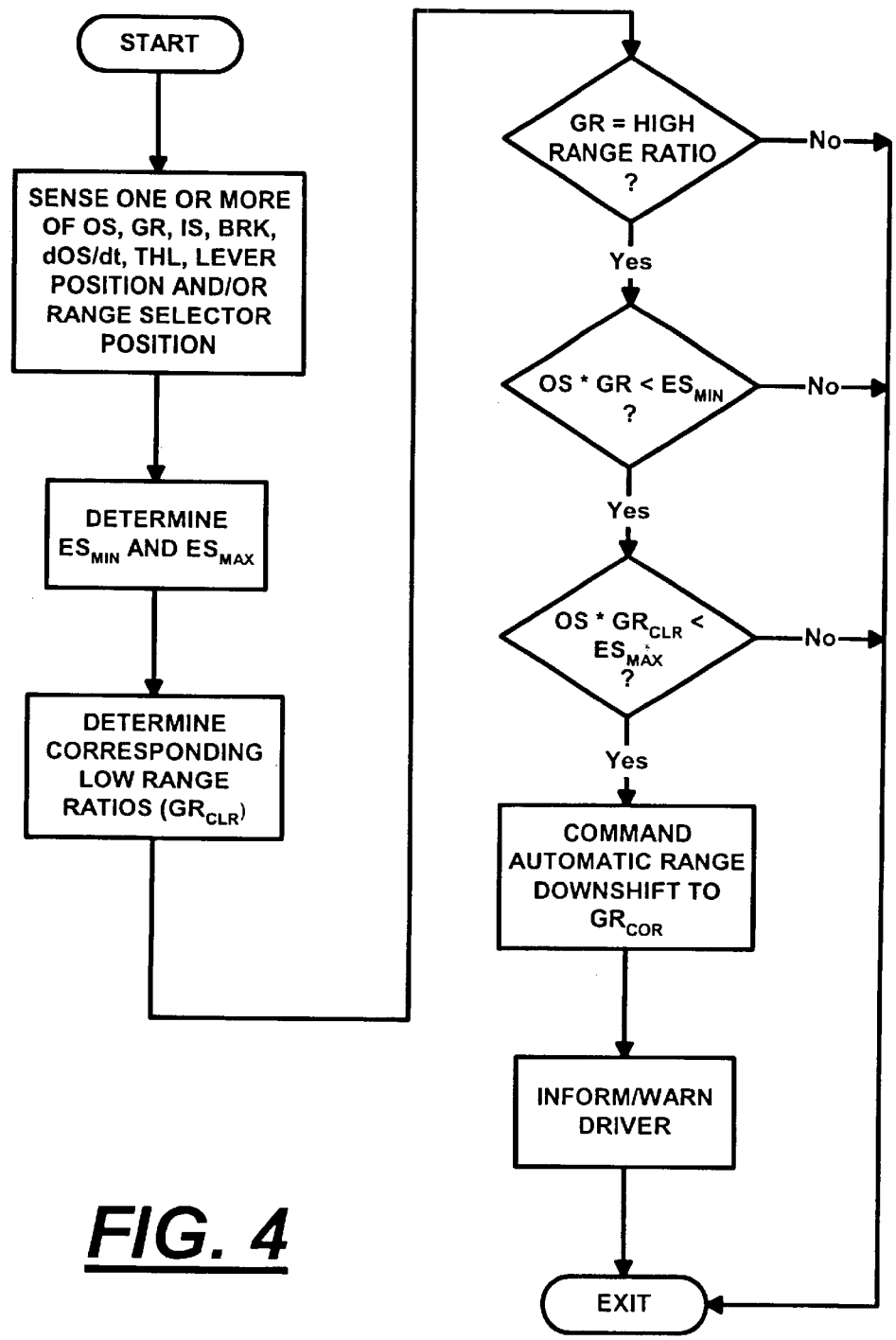
FIG. 4 is a schematic illustration, in flow chart format, of the range control of the present invention.

The range control of the present invention is shown in flow chart format in FIG. 4.

Accordingly, it may be seen that a new and improved range control is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling range shifting in a controller-assisted, manually shifted vehicular transmission system (10) comprising an internal combustion engine (12) driving an input shaft (24) of a compound transmission (16) having a multiple-ratio main section (16A) shifted by a shift lever (26) manually movable in a shift pattern and a range auxiliary section (16B) connected in series with said main section, a range shift mechanism (28) for automatically implementing manually initiated range shifts and a controller (54) for receiving input signals (52) indicative of system operating conditions and for processing same according to predetermined logic rules to issue command output signals (56) to system actuators, including said range shift mechanism, said method comprising the steps:

(a) determining a corresponding low range ratio ($GR_{CLR}$) for at least one high range ratio of said transmission; and (b) if (i) said transmission is engaged in one of said at least one high range ratio, (ii) calculated engine speed in said high range ratio is less than a predetermined minimum engine speed value ($OS*GR<ES_{MIN}$), and (iii) calculated engine speed in said corresponding low range ratio of said high range ratio is less than a predetermined maximum engine speed value ($OS*GR_{CLR}<ES_{MAX}$), then commanding said range shift mechanism to downshift into said corresponding low range ratio without driver initiation of a range shift.

2. The method of claim 1 further comprising informing the operator when said range shift mechanism is commanded to downshift without driver initiation.

3. The method of claim 1 wherein said engine is a diesel engine and said minimum engine speed value is about 600 to 900 RPM (600 RPM<$ES_{MIN}$<900 RPM).

4. The method of claim 3 wherein said maximum engine speed value is about 2100 to 2500 RPM (2100 RPM<$ES_{MAX}$<2500 RPM).

5. The method of claim 1 wherein said shift pattern is a "double-H" type pattern and driver initiation of a range shift is by shift lever movement in said shift pattern.

6. The method of claim 2 wherein said shift pattern is a "double-H" type pattern and driver initiation of a range shift is by shift lever movement in said shift pattern.

7. The method of claim 1 wherein said shift pattern is a "repeat-H" type shift pattern and a range switch 26A is provided for driver initiation of range shifting.

8. The method of claim 2 wherein said shift pattern is a "repeat-H" type shift pattern and a range switch 26A is provided for driver initiation of range shifting.

9. The method of claim 1 wherein step (b) further requires that (iv) vehicle deceleration exceed a reference value (($dOS/dt$)<REF) for commanding a range downshift without driver initiation.

10. The method of claim 2 wherein step (b) further requires (iv) vehicle deceleration exceed a reference value (($dOS/dt$)<REF) for commanding a range downshift without driver initiation.

11. The method of claim 1 wherein step (b) further requires (v) lack of shift lever movement for a given time for commanding a range downshift without driver initiation.

12. The method of claim 9 wherein step (b) further requires (v) lack of shift lever movement for a given time for commanding a range downshift without driver initiation.

13. A controller-assisted, manually shifted vehicular transmission system (10) comprising an internal combustion engine (12) driving an input shaft (24) of a compound transmission (16) having a multiple-ratio main section (16A) shifted by a shift lever (26) manually movable in a shift pattern and a range auxiliary section (16B) connected in series with said main section, a range shift mechanism (28) for automatically implementing manually initiated range shifts and a controller (54) for receiving input signals (52) indicative of system operating conditions and for processing same according to predetermined logic rules to issue command output signals (56) to system actuators, including said range shift mechanism, said system characterized by said logic rules, including rules for:

(a) determining corresponding low range ratios ($GR_{CLR}$) for at least one high range ratio of said transmission; and (b) if (i) said transmission is engaged in one of said at least one high range ratio, (ii) calculated engine speed in said high range ratio is less than a predetermined minimum engine speed value ($OS*GR<ES_{MIN}$), and (iii) calculated engine speed in a corresponding low range ratio of said high range ratio is less than a predetermined maximum engine speed value ($OS*GR_{CLR}<ES_{MAX}$), then commanding said range shift mechanism to downshift into said corresponding low range ratio without driver initiation of a range shift.

14. The system of claim 13 wherein said logic rules are further effective for informing the operator when said range shift mechanism is commanded to downshift without driver initiation.

15. The system of claim 13 wherein said engine is a diesel engine and said minimum engine speed value is about 600 to 900 RPM (600 RPM<$ES_{MIN}$<900 RPM).

16. The system of claim 15 wherein said maximum engine speed value is about 2100 to 2500 RPM (2100 RPM<$ES_{MAX}$<2500 RPM).

17. The system of claim 13 wherein said shift pattern is a "double-H" type pattern and driver initiation of a range shift is by shift lever movement in said shift pattern.

18. The system of claim 14 wherein said shift pattern is a "double-H" type pattern and driver initiation of a range shift is by shift lever movement in said shift pattern.

19. The system of claim 13 wherein said shift pattern is a "repeat-H" type shift pattern and a range switch 26A is provided for driver initiation of range shifting.

20. The system of claim 14 wherein said shift pattern is a "repeat-H" type shift pattern and a range switch 26A is provided for driver initiation of range shifting.

21. The system of claim 13 wherein said logic rules are further effective to require that (iv) vehicle deceleration exceed a reference value (($dOS/dt$)<REF) for commanding a range downshift without driver initiation.

22. The system of claim 14 wherein said logic rules are further effective to require that (iv) vehicle deceleration exceed a reference value (($dOS/dt$)<REF) for commanding a range downshift without driver initiation.

23. The system of claim 13 wherein said logic rules further require (v) lack of shift movement for a given time for commanding a range downshift without driver initiation.

24. The system of claim 21 wherein said logic rules further require (v) lack of shift movement for a given time for commanding a range downshift without driver initiation.

* * * * *